United States Patent
Fontaine et al.

(10) Patent No.: US 11,796,082 B2
(45) Date of Patent: Oct. 24, 2023

(54) METHODS AND APPARATUS TO DETECT AND/OR RECOVER FROM FAILURES IN VALVE CONTROL DEVICES

(71) Applicant: Fisher Controls International LLC, Marshalltown, IA (US)

(72) Inventors: Michael Fontaine, Marshalltown, IA (US); David Lee Smid, Marshalltown, IA (US)

(73) Assignee: FISHER CONTROLS INTERNATIONAL, LLC, Marshalltown, IA (US)

( * ) Notice: Subject to any disclaimer, the term of this patent is extended or adjusted under 35 U.S.C. 154(b) by 752 days.

(21) Appl. No.: 16/836,393

(22) Filed: Mar. 31, 2020

(65) Prior Publication Data
US 2021/0301940 A1    Sep. 30, 2021

(51) Int. Cl.
*F16K 37/00* (2006.01)

(52) U.S. Cl.
CPC ........ *F16K 37/005* (2013.01); *F16K 37/0041* (2013.01)

(58) Field of Classification Search
CPC .............. F16K 37/005; F16K 37/0041; F16K 37/0091; G05B 2219/25312; G05B 2219/33326
See application file for complete search history.

(56) References Cited

U.S. PATENT DOCUMENTS

| | | | |
|---|---|---|---|
| 5,341,839 A * | 8/1994 | Kobayashi | E03D 5/10 137/614.19 |
| 5,970,430 A | 10/1999 | Burns et al. | |
| 10,422,438 B2 | 9/2019 | Fontaine | |
| 2008/0023662 A1 * | 1/2008 | Reinicke | F16K 15/1823 251/58 |
| 2010/0152908 A1 | 6/2010 | Meier et al. | |
| 2018/0112798 A1 * | 4/2018 | Junk | F15B 19/005 |

FOREIGN PATENT DOCUMENTS

EP    2918883 A1    9/2015

OTHER PUBLICATIONS

International Searching Authority. "International Search Report and Written Opinion" dated Jun. 1, 2021 in connection with International Application No. PCT/US2021/024842, 14 pages.

* cited by examiner

*Primary Examiner* — Atif H Chaudry
(74) *Attorney, Agent, or Firm* — HANLEY, FLIGHT & ZIMMERMAN, LLC

(57) ABSTRACT

Methods and apparatus to detect and/or recover from failures in valve control devices. An apparatus includes an input signal generator to provide a digital input signal to a first converter. The first converter corresponds to one of a supply converter or an exhaust converter. The supply converter controls actuation of a supply relay to deliver pressurized fluid to an actuator operatively coupled to a valve in a process control system. The exhaust converter to control actuation of an exhaust relay to exhaust the pressurized fluid from the actuator. The digital input signal triggers application of a current to the first converter to open the first converter. The apparatus further including a failure detector to: determine a difference in at least one of a pressure in the actuator or a position of a flow control member in the valve; and detect a failure when the difference satisfies a failure threshold.

20 Claims, 4 Drawing Sheets

METHODS AND APPARATUS TO DETECT AND/OR RECOVER FROM FAILURES IN VALVE CONTROL DEVICES

FIELD OF THE DISCLOSURE

This disclosure relates generally to valve controllers, and, more particularly, to methods and apparatus to detect and/or recover from failures in valve control devices.

BACKGROUND

Control valves (e.g., sliding stem valves, rotary valves, axial flow valves, globe valves, etc.) are commonly used in industrial processes, such as oil and gas pipeline distribution systems and chemical processing plants, to control the flow of process fluids. These control valves are often automated using a pressure-operated actuator that is controlled by a remote-operated field instrument or control device. The field instrument communicates with a process control computer to command fluid flow changes within the valve to achieve a desired control strategy via pressure-operated actuators. Electro-pneumatic converters, such as current-to-pressure (I/P) transducers, are commonly used in field instruments to provide a conversion of an electrical signal to volumetric flow or pressure output to control the actuator and, thus, the control valve.

SUMMARY

An example apparatus disclosed herein includes an input signal generator to provide a digital input signal to a first converter at a first point in time. The first converter corresponds to one of a supply converter or an exhaust converter. The supply converter controls actuation of a supply relay to deliver pressurized fluid to an actuator operatively coupled to a valve in a process control system. The exhaust converter controls actuation of an exhaust relay to exhaust the pressurized fluid from the actuator. The digital input signal triggers application of a current to the first converter to open the first converter. The apparatus further includes a failure detector to: determine a difference in at least one of a pressure in the actuator or a position of a flow control member in the valve over a period of time following the first point in time; and detect a failure of at least one of the supply converter, the exhaust converter, the supply relay, or the exhaust relay when the difference satisfies a failure threshold.

Some examples instructions disclosed herein, when executed, cause a machine to at least provide a digital input signal to a first converter at a first point in time. The first converter corresponds to one of a supply converter or an exhaust converter. The supply converter controls actuation of a supply relay to deliver pressurized fluid to an actuator operatively coupled to a valve in a process control system. The exhaust converter controls actuation of an exhaust relay to exhaust the pressurized fluid from the actuator. The digital input signal triggers application of a current to the first converter to open the first converter. The example instructions further cause the machine to determine a difference in at least one of a pressure in the actuator or a position of a flow control member in the valve over a period of time following the first point in time. The example instructions also cause the machine to detect a failure of at least one of the supply converter, the exhaust converter, the supply relay, or the exhaust relay when the difference satisfies a failure threshold.

An example method includes providing a digital input signal to a first converter at a first point in time. The first converter corresponds to one of a supply converter or an exhaust converter. The supply converter controls actuation of a supply relay to deliver pressurized fluid to an actuator operatively coupled to a valve in a process control system. The exhaust converter controls actuation of an exhaust relay to exhaust the pressurized fluid from the actuator. The digital input signal triggers application of a current to the first converter to open the first converter. The example method further includes determining a difference in at least one of a pressure in the actuator or a position of a flow control member in the valve over a period of time following the first point in time. The example method also includes detecting a failure of at least one of the supply converter, the exhaust converter, the supply relay, or the exhaust relay when the difference satisfies a failure threshold.

Figure 1:
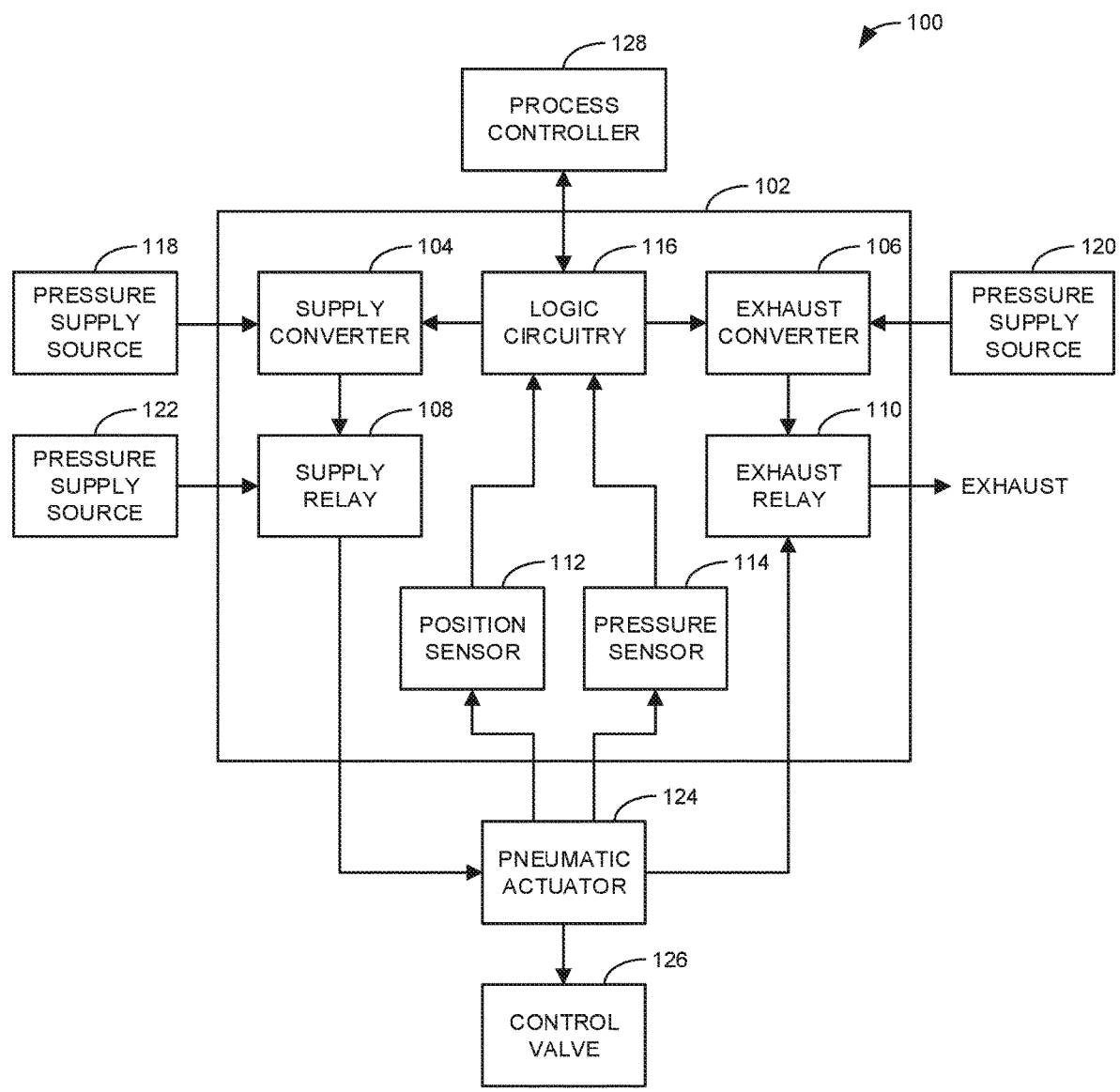
FIG. 1 is a schematic illustration of an example process control system including an example control device constructed in accordance with teachings disclosed herein.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Certain field instruments and/or control devices (e.g., a current-to-pressure (I/P) transducer, a digital valve controller (DVC)) are constructed to control the operation of a pneumatic actuator that causes a control valve to change its operational state or position (e.g., fully open, fully closed, and/or any suitable intermediate position therebetween). Typically, such control devices include an electro-pneumatic converter (also referred to as an electro-pneumatic transducer, latching pneumatic transducer, or a current-to-pressure (I/P) converter) to convert an electrical input signal into a pneumatic pressure signal that activates a pneumatic actuator to move a control valve in a desired manner. As used herein, references to moving a control valve, changing the position of a control valve, and other similar phrases, mean that a flow control member (e.g., a ball, a disk, a plug, etc.) within the valve is moved (e.g., by rotation, by linear translation, etc.) relative to a body of the valve. Similarly, as used herein, references to movement or change in position of an actuator mean changes in the actuation mechanism of the actuator to cause a corresponding change in the position or movement of the flow control member of an associated control valve. Further, for the sake of brevity, the term "converter" is used interchangeably herein with the term "electro-pneumatic converter."

In many instances, the electrical input signal provided to an electro-pneumatic converter corresponds to and/or is based on a control signal from a controller or other device in an associated process control system. More particularly, in some instances, the control signal may be provided directly to the electro-pneumatic converter for direct conversion from an electrical signal to a pneumatic signal. In other instances, the control signal defines a set point that is analyzed relative to sensor feedback data by logic circuitry (e.g., a microprocessor) within the control device containing the electro-pneumatic converter. In such situations, the logic circuitry generates a suitable input signal for the electro-pneumatic converter based on an error designated by a difference between the set point and the sensor feedback data. Sensor feedback data may include pressure feedback data indicating the current pressure within an associated actuator and/or position feedback data indicating the current position of a corresponding control valve.

Frequently, control devices used to operate pneumatic actuators also include a relay or amplifier operatively coupled to the electro-pneumatic converter to increase or amplify the output pressure and/or flow rate of fluid to the pneumatic actuator to facilitate the actuation or movement of a control valve. That is, in some examples, an electrical input signal is provided to a control device to drive an electro-pneumatic converter, and an output of the converter activates a relay, which in turn provides a pneumatic output to a pneumatic actuator.

Historically, the electrical input signal provided to control devices used to operate pneumatic actuators have been analog signals that enable the proportional control of the output of an electro-pneumatic converter of the control device. For example, the electrical input signal provided to a converter may correspond to a signal having a continuous current that is varied between 4 and 20 milliamperes. In such examples, the particular output of the converter (and, thus, the corresponding pressure output to a pneumatic actuator) is based on (e.g., proportional to) the value of the current along some calibrated range (e.g., from 4 to 20 milliamperes) with one end of the range corresponding to the fully closed position of the valve and the opposite end of the range corresponding to the fully open position.

Unlike such historical control devices, example control devices disclosed herein are implemented with digital (On/Off) electro-pneumatic converters that are controlled based on digital (On/Off) input signals. More particularly, the electrical input signals used to drive the electro-pneumatic converter in example control devices disclosed herein correspond to digital signals having discrete values that define when the converter is to be in a closed state (sometimes referred to as Off or unlatched) and an open state (sometimes referred to as On or latching). In the closed state, no pressurized fluid is provided downstream of the converter (e.g., to a relay and/or an actuator). In the open state, pressurized fluid is allowed to flow downstream of the electro-pneumatic converter. In some examples, a first input signal indicating the converter is to be in the open state causes a first current to be applied to the converter to open the converter. In some examples, the first current continues to be applied to the converter to keep it in the open state until a second input signal is provided to turn off the converter and return it to the closed state. In some examples, the second input signal causes a second current to be applied to the converter to close the converter. Additionally or alternatively, in some examples, the converter may have a default state in which the converter remains (or to which it returns) when there is no current applied. For example, a first input signal may cause the first current applied to the converter to switch the converter to an open state, thereby allowing the flow of pressurized fluid. A second input signal may remove the application of the first current such that no current is applied to the converter. In some such examples, the converter may automatically revert to the closed state. In some such examples, the second signal may cause a second current to be applied to the converter to close the converter even when the converter is constructed with a default state that closes automatically when no current is being applied.

Some example control devices include two separate electro-pneumatic converters that are controlled by respective digital (On/Off) input signals. In some such examples, a first one of the converters is referred to herein as the supply electro-pneumatic converter (or the supply converter) and the second converter is referred to herein as the exhaust electro-pneumatic converter (or the exhaust converter). In some examples, the control device also includes a first (supply) relay pneumatically coupled with the supply converter and a second (exhaust) relay pneumatically coupled with the exhaust converter. In examples disclosed herein, the supply converter and the supply relay cooperate to supply or provide pressurized fluid to an actuator to actuate a valve to move in a first direction toward a first state (e.g., toward the fully closed position or toward the fully open position). By contrast, the exhaust converter and the exhaust relay cooperate to exhaust or remove pressurized fluid from the actuator to actuate the valve to move in a second direction away from the first state (e.g., away from the fully closed position or away from the fully open position).

Implementing control devices using digital (On/Off) converters means that the converters produce only one of two outputs (either pressure is provided (when in the open state) or no pressure is provided (when in the closed state)) such that direct proportional control is not possible. Accordingly, in some examples, the operation of a pneumatic actuator is controlled via example control devices disclosed herein based on the timing of switching the supply and exhaust converters between their On and Off states. More particularly, in some examples, an amount of time that the supply converter needs to be opened to add pressure to an actuator is calculated. Then an initial input signal is provided to the supply converter to trigger the application of a first current that causes the supply converter to open. The supply converter remains open for the calculated amount of time and then a second input signal is provided to turn off the first current and/or apply a second current to cause the converter to close. The amount of time that either the supply converter or the exhaust converter are opened may be calculated and/or updated in substantially real-time based on sensor feedback data indicating the actual (e.g., measured) pressure in the actuator and/or the actual (e.g., measured) position of the associated control valve.

In some examples, the converters can be switched between the opened (On) state and the closed (Off) state relatively quickly to provide small increments of pressurized fluid to an actuator or to remove small increments of pressurized fluid from the actuator. The relatively quick switching between states for both converters enables relatively high precision of actuation. In some examples, a changed digital input signal may be provided to either one of the supply or exhaust converters, to either open or close the corresponding converter, as frequently as every 50 milliseconds (e.g., up to 20 distinct digital input signals provided per second). In other examples, the digital signals may be provided at a rate that is greater than or less than 20 times a second. However, in some examples, the option to provide control signals at a more frequent rate is not available because of power budget constraints on the control device.

As mentioned above, in some examples, a single input signal may switch a converter to an open position that remains in that state for any relevant period of time until a second input signal causes the converter to close. In some examples, the converter is maintained in the open position based on a continuously applied current. However, in some examples, the amount of current needed to keep the converter in the open position is less than the amount of current needed to initially open the converter. Accordingly, in some examples, the single input signal may trigger the application of a first (relatively high) current to initially open the converter and then apply a second (reduced) current for the remaining duration that the converter is to be opened (e.g., until pressurized fluid is added or exhausted from an actuator sufficiently to move the valve to a desired set point). Applying a reduced current to maintain the converter in an open position reduces the overall power consumption of the device because the higher current used to open the converter is only needed for a relatively short period of time when the input signal is first provided to open the converter.

While the above approach reduces power requirements, there may be situations where the converter fails to open in response to the initial high current that is applied before the current is reduced for the duration of time the converter is to be open. If the converter does not open when the high current is applied, the converter will not subsequently open despite the continued application of the lower current because the lower current is insufficient to open the converter. Accordingly, example control devices disclosed herein monitor sensor feedback data (e.g., position and/or pressure data) over time to detect potential failures in the expected operation of the control device. If a failure is detected, the control devices may automatically provide a new input signal to the appropriate converter that again triggers the high current needed to switch the state of the converter to attempt to resolve the failed state and restore the device to normal operation. Situations where an example control device temporarily malfunctions so as to not operate as expected in response to a particular input signal and then subsequently begins working as expected in response to a similar input signal at a later point in time without any direct intervention by maintenance personnel is referred to herein as an intermittent failure. By contrast, situations where the example control device stops working and does not return to normal operation after some threshold period of time, despite additional input signals being provided to drive the operation of the control device, is referred to herein as a complete failure.

There are different ways that example control devices may fail (either intermittently or completely). As mentioned above, a converter may fail to respond to a particular input signal intended to switch the state of the converter. Even if the converters operate as expected in response to input signals, the corresponding relays may fail to open or close in response to the opening or closing of the respective converters. In other words, any one of the supply converter, the exhaust converter, the supply relay, or the exhaust relay may fail to work properly and be the basis for a detected failure. In some examples, it may not be known which component(s) gave rise to a particular detected failure. Accordingly, as disclosed in more detail below, in some examples, different procedures are implemented to attempt to recover from a detected failure that account for the different potential sources of failure.

Example control devices may exhibit one or more intermittent failures that occur before and/or leading to a complete failure. As such, tracking and/or monitoring intermittent failures can be a useful diagnostic tool in predicting the approach of a complete failure of a control device. Predicting the approach of a complete failure of a control device can enable maintenance personnel to take appropriate action at a more convenient and/or cost effective time. For instance, if maintenance personnel are made aware that a control device is beginning to malfunction (e.g., has intermittently failed), but has not exhibited a complete failure, the personnel can replace the affected device during a scheduled maintenance before a complete failure. By contrast, if intermittent failures are not tracked or detected, personnel may be taken by surprise when the device fails completely at an inopportune time that results in an unscheduled shutdown of a process control system to enable the device to be replaced. Accordingly, as disclosed further herein, example control devices track and/or monitor failures in the operation of any of the supply converter, the exhaust converter, the supply relay, and the exhaust relay. Further, in some examples, the detection of such failures is reported to a processor controller and/or triggers an alert that is provided to an operator, maintenance personnel, and/or other individual to take suitable responsive action.

FIG. 1 is a schematic illustration of an example process control system 100 including an example control device 102 constructed in accordance with teachings disclosed herein. In this example, the control device 102 includes an example supply electro-pneumatic converter 104, an example exhaust electro-pneumatic converter 106, an example supply relay 108, an example exhaust relay 110, an example position sensor 112, an example pressure sensor 114, and example logic circuitry 116. In some examples, the logic circuitry 116 is implemented by one or more analog or digital circuit(s), logic circuits, programmable processor(s), programmable controller(s), microcontroller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

As shown in the illustrated example, the supply converter 104 is pneumatically coupled to a first pressure supply source 118, the exhaust converter 106 is pneumatically coupled to a second pressure supply source 120, and the supply relay 108 is pneumatically coupled to a third pressure supply source 122. The pressure supply sources 118, 120, 122 may be, for example, plant air (e.g., compressed fluid, such as air or natural gas, distributed through a processing plant), pressurized fluid from a fluid process system, and/or pressurized fluid from any other source of fluid. In some examples, one or more of the first, second, and/or third pressure supply sources 118, 120, 122 correspond to a single pressure supply source. In some examples, the third pressure supply source 122 coupled to the supply relay 108 corresponds to a relatively high pressure supply, whereas the first and second pressure supply sources 118, 120 coupled to the converters 104, 106 correspond to either two separate or a single relatively low pressure supply. In some examples, the relatively low pressure supply provided by the first and second pressure supply sources 118, 120 is drawn from the relatively high pressure supply source 122 and regulated to the relatively low pressure.

In the illustrated example, the logic circuitry 116 generates an input signal that causes a current to be applied to the supply converter 104 to switch the supply converter 104 to an open position. More particularly, in some examples, the supply converter 104 includes a solenoid with a coil wrapped around a core that is positioned adjacent a moveable armature. In some such examples, the coil may be electrically activated (e.g., by the applied current triggered by the input signal) to cause the armature within the converter 104 to move between a first (closed) position and a second (open) position that is closer to the core of the solenoid. In some examples, the armature in the closed position blocks the flow of pressurized fluid from passing between a supply port (e.g., pneumatically coupled to the first pressure supply source 118) and an outlet port of the supply converter 104 (e.g., pneumatically coupled to the supply relay 108). By contrast, in some examples, the armature in the open position allows for the passage of pressurized fluid (e.g., from the first pressure supply source 118) between the supply port and the outlet port to the supply relay 108.

In some examples, the logic circuitry 116 initially applies a higher current to the solenoid within the supply converter 104 to move the armature to the open position and then reduces the current to a lower current. Once the armature is moved closer to the core of the solenoid (based on the higher current), less magnetic force is needed to held the armature in the second position. Thus, less current is needed to generate a magnetic field sufficient to hold the armature in place in the open position. Therefore, in some examples, the logic circuitry 116 reduces the current once the armature is moved to the open position and, thus, reduces the total power consumed by the converter 104.

In some examples, after the supply current has been maintained in the open position for an appropriate amount of time (determined by the control logic of the control device 102), the logic circuitry 116 provides a second input signal to the supply converter 104 to switch the supply converter 104 to a closed position. In some examples, such an input signal reduces the current applied to the supply converter 104 to zero, with the armature being urged to the closed position by a biasing spring. Additionally or alternatively, in some examples, the input signal causes another current to be applied in the reverse direction to the coil of the solenoid in the converter 104 to facilitate movement of the armature to the closed position. In some such examples, the current is provided for a relatively brief period of time because a biasing spring within the converter 104 will maintain the armature in the closed position after the reverse current is removed.

As mentioned above, when the supply converter 104 is open, pressurized fluid from the first pressure supply source 118 is supplied to the supply relay 108 to move an actuating member within the supply relay 108 that opens the supply relay 108 so that an input port of the supply relay 108 is in fluid communication with an output port of the supply relay 108. In some examples, the input port of the supply relay 108 is pneumatically coupled with the third pressure supply source 122 and the output port of the relay 108 is pneumatically coupled with a pneumatic actuator 124. Thus, when the supply converter 104 is in the open state, pressurized fluid from the first pressure supply source 118 causes the supply relay 108 to move to an open state, thereby causing pressurized fluid from the third pressure supply source 122 to be provided to the pneumatic actuator 124. By contrast, when the supply converter 104 is in the closed state (either in response to the reduction of the applied current to zero or in response to a reverse current triggered by another input signal from the logic circuitry 116), pressurized fluid is blocked from reaching the supply relay 108 such that the supply relay 108 moves to the closed state (e.g., due to a biasing spring). When the supply relay 108 is in the closed state pressurized fluid from the third pressure supply source 122 is blocked from reaching the pneumatic actuator 124.

In some examples, the exhaust converter 106 and the exhaust relay 110 are constructed and function in substantially the same way as the supply converter 104 and the supply relay 108 except that the exhaust relay 110 is arranged to exhaust or remove pressurized fluid from the pneumatic actuator 124. More particularly, in some examples, the logic circuitry 116 provides an input signal to the exhaust converter 106 to switch the exhaust converter 106 to an open state, thereby causing the exhaust relay 110 to open and exhaust pressurized fluid from within the actuator 124. In some examples, the input signal provided to the exhaust converter 106 triggers an initial current to move an armature within the exhaust converter 106 toward a solenoid. Once the armature has moved to an open position, the initial current is reduced to a second, lower current to maintain the armature in the open position as long as needed according to the control logic operating the control device 102. When the exhaust converter 106 is open, pressurized fluid from the second pressure supply source 120 is provided to the exhaust relay 110 to cause the exhaust relay 110 to open, thereby enabling the exhaust of pressurized fluid from within the pneumatic actuator 124. When the exhaust converter 106 is closed (e.g., in response to another input signal to turn off the exhaust converter 106), pressurized fluid from the second pressure supply source 120 is blocked from reaching the exhaust relay 110. As a result, the exhaust relay 110 will move to a closed state (e.g., due to a biasing spring), thereby blocking pressurized fluid from being exhausted out from within the pneumatic actuator 124.

The pneumatic actuator 124 actuates or moves an associated control valve 126 based on the pressure of fluid added to the actuator 124 (when the supply converter 104 and supply relay 108 are opened) and/or removed from the actuator 124 (when the exhaust converter 106 and the exhaust relay 110 are opened). In some examples, the pneumatic actuator 124 is a single acting actuator. In some examples, the pneumatic actuator 124 is a double acting actuator.

In some examples, whether the logic circuitry 116 provides input signals to open (or close) the converters 104, 106 and how long each of the converters remains in either the closed state or the open state is determined based on sensor feedback data compared with a set point defining a particular position for the control valve 126. In some examples, the set point is defined by a control command received from a remotely located process controller 128 in communication with the logic circuitry 116. In some examples, the set point is provided via a different device (e.g., a handheld field device) in communication with the control device 102. In some examples, the set point is provided via a user entering the set point via a user interface on the control device 102.

In some examples, the sensor feedback data includes position feedback data generated by the position sensor 112 that measures the rotational and/or linear movement of the pneumatic actuator 124 and/or the control valve 126. Additionally or alternatively, in some examples, the sensor feedback data includes pressure feedback data generated by a pressure sensor measuring the pressure within the pneumatic actuator 124 that is operatively coupled to the control valve 126. Although the example control device 102 of FIG. 1 is shown as including both a position sensor 112 and a pressure sensor 114, in some examples, one or both of the position sensor 112 and the pressure sensor 114 are implemented separately from the control device 102 (e.g., external to the control device 102 but communicatively coupled thereto). In some examples, either the position sensor 112 or the pressure sensor 114 is omitted entirely such that the feedback sensor data is limited exclusively to either position feedback data or pressure feedback data. In some examples, the control device 102 includes and/or is in communication with more than one position sensor 112 and/or more than one pressure sensor 114.

In some examples, the amount of error in the position and/or pressure measurements relative to the set point determines the duration that either of the supply converter 104 or the exhaust converter 106 is switched open to either supply pressurized fluid to the actuator 124 or exhaust pressurized fluid from the actuator 124. Further, the direction of error (e.g., whether high or low) relative to the set point determines which one of the supply converter 104 or the exhaust converter 106 is opened. In some examples, input signals to open and/or close each of the converters 104, 106 may be provided in relatively quick succession (e.g., a new input signal approximately every 50 ms) to add or remove relatively small increments of pressurized fluid in the actuator 124 for relatively precise control. Of course, where the valve 126 is to be moved from one position to a different position, there may be a relatively long period of time (e.g., more than 1 second) in which either pressurized fluid is being supplied to the pneumatic actuator 124 or pressurized fluid is being exhausted from the pneumatic actuator 124.

For purposes of explanation, periods of time during which the logic circuitry 116 directs the supply converter 104 (and, thus, the supply relay 108) to be open are referred to herein as supply actions of the example control device 102. By contrast, periods of time during which the logic circuitry 116 directs the exhaust converter 106 (and, thus, the exhaust relay 110) to be open are referred to herein as exhaust actions of the example control device 102. As indicated above, a supply action or an exhaust action can continue for any relevant period as determined by the logic circuitry 116 to bring the pressure in the actuator 124 and/or the position of the actuator 124 (and/or the associated valve 126) into correspondence with a set point defining a desired position of the control valve 126. In some examples, either a supply action or an exhaust action is triggered by a single input signal to the corresponding supply converter 104 or the exhaust converter 106 that directs the corresponding converter to switch to the open state. In some examples, the input signal to open either the supply converter 104 or the exhaust converter 106 triggers a first current that is applied to the solenoid of the corresponding converter 104, 106 for a first (relatively brief) period of time to initially move the armature of the solenoid in the converter 104, 106 towards the open position, thereby placing the converter in the open state. Thereafter, a second current that is less than the first current is applied to the solenoid for the remaining duration of the supply action or exhaust action to hold the converter in the open state. Thus, in some examples, the entire duration of either a supply action or an exhaust action is implemented in response to a single input signal to the appropriate converter 104, 106. In some examples, when the supply action or the exhaust action is to end, the logic circuitry 116 provides a subsequent input signal to the respective converter 104, 106 to switch to the converter to the closed state (e.g., by either triggering a third current applied to the solenoid in the opposite direction to the first and second currents or merely ceasing the application of current to the solenoid).

The above methodology reduces power requirements to implement the control device because the relatively high current (e.g., the first current) needed to activate or turn on the converters 104, 106 is limited to the initial opening of the converters and then a reduced current (e.g., the second current) is applied thereafter. In some examples, the high current is about 3 milliamperes and the low or reduced current is about 1 milliampere. In some examples, the lower current is insufficient to open the corresponding converter 104, 106 from a closed position. Thus, if either of the converters 104, 106 fails to open in response to the relatively brief application of the high current, it is unlikely that the converters 104, 106 will subsequently open despite the continuous application of the lower current thereafter. Accordingly, in some examples, failures in the expected operation of the example control device 102 are detected so that subsequent input signals may be provided to re-initiate the appropriate action (e.g., again apply the high current to attempt to open a particular converter 104, 106 before again reducing the applied current to the low current to maintain the converter in the open state).

Detecting and attempting recovery from and/or correction of a failure in the expected operation of the control device 102, as outlined above, is important because the control device may otherwise get stuck in either a supply action or an exhaust action indefinitely. As an example, assume that the sensor feedback data (whether position data and/or or pressure data) indicates that the pressurized fluid needs to be added to the pneumatic actuator 124 to move the valve 126 towards a position defined by a current set point. Accordingly, the logic circuitry 116 determines that a supply action is needed and, therefore, provides an input signal to the supply converter 104 to switch the supply converter 104 to an open state, thus causing the supply relay 108 to also open and provide pressurized fluid to the actuator 124. If the control device 102 is working properly, the actuator 124 will be pressurized, thereby moving the control valve 126 toward the set point, which will be indicated by changes or differences in the sensor feedback data across time. Once the sensor feedback data indicates the valve 126 has moved to the desired position, the supply action may be ended by providing a new input signal to turn off the supply converter 104. However, if the control device 102 is not working properly (e.g., the supply converter 104 does not open in response to the initial input signal to begin the supply action), the actuator 124 will not be supplied the pressure expected to move the control valve 126. As a result, the control valve 126 will not move as expected and the sensor feedback data will continue to indicate that pressurized fluid still needs to be added to move towards the set point. Therefore, if such a failure is not detected, no new input signal will be provided because the control logic implemented by the logic circuitry operates as if the supply converter 104 is already open based on the input signal previously provided to open the supply converter 104.

To avoid the control device 102 from being stuck in the above failure state, the logic circuitry 116 detects the failure by monitoring the sensor feedback data over a period of time and identifying when the change in the sensor feedback data over the period of time (e.g., change in position and/or change in pressure) is not commensurate with progression towards a set point during a supply action. That is, if the control logic implemented by the logic circuitry 116 dictates the addition of pressurized fluid to the actuator (e.g., a supply action) for some period of time, but the sensor feedback data indicates relatively little increase (e.g., less than a threshold) in the pressure of the actuator 124 (or a relatively little change in a corresponding position of the valve 126) during the period of time, the logic circuitry 116 may infer a failure has occurred that is preventing the proper implementation of the supply action. In some examples, when such a failure is detected, the logic circuitry 116 automatically attempts to recover from the failure by reissuing the input signal that first initiated the supply action. In this manner, although the supply converter 104 in the above example did not respond to the initial input signal, the supply converter 104 may respond to a second or subsequent input signal that triggers the re-application of the first (relatively high) current to open the converter. If the supply converter 104 does respond to the second or subsequent input signal, then the control device 102 may continue to operate as expected to properly control the valve 126.

The above example is described with reference to the failure of the supply converter 104 to respond to an input signal. However, there are other scenarios that may give rise to a similar failure state in which the actuator 124 is not being pressurized despite an input signal being provided to open the supply converter 104. For instance, while the supply converter 104 may respond appropriately to an input signal, the supply relay 108 may fail to open such that no pressurized fluid is provided to the actuator 124. In some examples, reissuing the input signal to the supply converter 104 one or more subsequent times may resolve the issue by causing the supply relay 108 to open.

Another failure scenario in which the actuator 124 is not being pressurized as expected occurs when the exhaust relay 110 is open when it is expected to be closed (which may or may not be based on the exhaust converter 106 being open when it is expected to be closed). In such situations, even if the supply converter 104 and the supply relay 108 are both functioning properly, the pneumatic actuator 124 may not be pressurized as desired because the pressurized fluid provided to the actuator 124 is immediately exhausted out via the improperly opened exhaust relay 110. In such situations, reissuing the input signal to open the supply converter 104 will not resolve the failure because the failure is based on a malfunction of the exhaust converter 106 and/or the exhaust relay 110. Accordingly, in some examples, in addition to reissuing an input signal to open the supply converter 104 following a detected failure in a supply action, the logic circuitry 116 may also provide an input signal that directs the exhaust converter 106 to a closed state. Providing such input signals following a detected failure during a supply action may resolve an intermittent failure in the exhaust converter 106 and/or the exhaust relay 110 that prevented these device from closing in response to a previous input signal directing such a closure.

In some examples, similar failures may be detected in connection with the implementation of an exhaust action. Further, similar procedures of reissuing input signals may be implemented following the detection of such failures during an exhaust action to attempt to recover from such failures. For instance, in some examples, if the sensor feedback data indicates the pressurized fluid in the pneumatic actuator 124 is to be exhausted to move the control valve 126 towards a set point, but a change in the sensor feedback data over a threshold period of time during an exhaust action does not indicate much progress in exhausting the fluid, the logic circuitry 116 may provide a new input signal to the exhaust converter 106 to attempt to cause the exhaust converter 106 and the exhaust relay 110 to open (which may have not done so in response to a similar input signal previously provided when initiating the exhaust action). Additionally or alternatively, in some examples, the logic circuitry 116 may provide an input signal to the supply converter 104 directing the supply converter 104 to close in response to a detected failure (in the event the supply converter 104 and/or the supply relay 108 failed to previously close at the end of a last supply action).

In some examples, the logic circuitry 116 logs each detected failure to enable the tracking of the number, frequency, and/or temporal spacing of failures over time. In some examples, failures detected during supply actions are tracked independently of failures detected during exhaust actions. In some examples, failures occurring during either supply actions or exhaust actions may be tracked together. In some examples, failures detected by the logic circuitry 116 may be reported to the process controller 128 as an alert to be presented to a control room operator and/or other personnel (e.g., maintenance personnel). In some examples, the reporting of failures occurs after each failure is detected. In other examples, the reporting of failures occurs after the number of failures reaches a certain threshold and/or when a threshold number of failures is detected within a particular timeframe. In some examples, the particular conditions that trigger the reporting of detected failure(s) may be configured by an end user of the control device 102.

Figure 2:
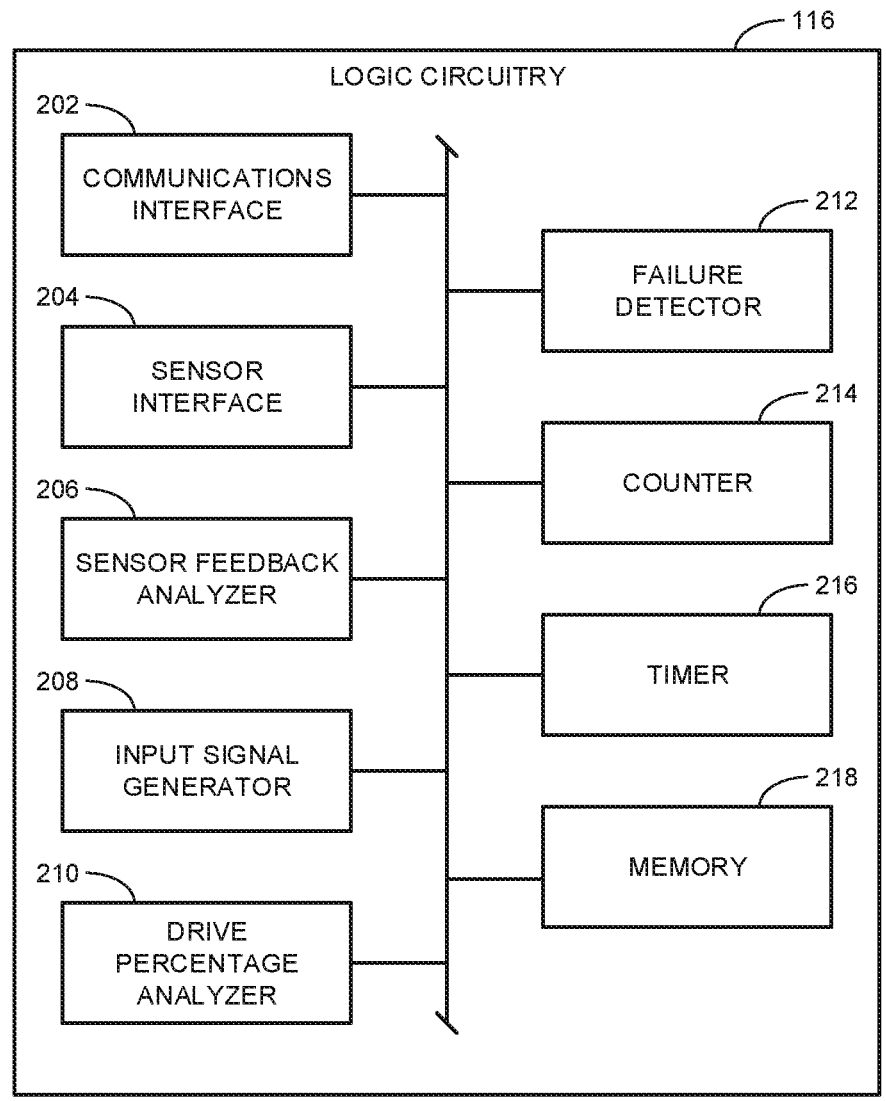
FIG. 2 illustrates an example manner of implementing the example logic circuitry of the example control device of FIG. 1.

FIG. 2 illustrates an example manner of implementing the example logic circuitry 116 of the example control device 102 of FIG. 1. As shown in FIG. 2, the example logic circuitry 116 includes an example communications interface 202, an example sensor interface 204, an example sensor feedback analyzer 206, an example input signal generator 208, an example drive percentage analyzer 210, an example failure detector 212, an example counter 214, an example timer 216, an example memory 218.

In the illustrated example of FIG. 2, the example communications interface 202 enables communications between the control device 102 and the process controller 128 and/or other components in a process control system. Thus, in some examples, the control device 102 receives set point(s) and/or other control signals from the process controller 128 via the example communications interface 202. In some examples, the set point may be stored in the example memory 218.

Further, in some examples, the logic circuitry 116 provides data (e.g., sensor feedback data, detected failures, etc.) to the process controller 128.

In the illustrated example of FIG. 2, the example sensor interface 204 receives sensor feedback data from the position sensor 112 and/or the pressure sensor 114. In the illustrated example of FIG. 2, the example sensor feedback analyzer 206 analyzes the sensor feedback data relative to a set point stored in the example memory 218. Based on the analysis, the example input signal generator 208 generates input signals that are provided to either the supply converter 104 or the exhaust converter 106 to either open or close the converters 104, 106.

In the illustrated example of FIG. 2, the example drive percentage analyzer 210 determines the current supply drive percentage and exhaust drive percentage for the control device. As used herein, the supply drive percentage defines the proportion or percentage of a most recent period of time during which the input signals provided to the supply converter 104 drive the supply converter 104 to the open state to cause pressurized air to be added (supplied) to the actuator 124. That is, the supply drive percentage is the percentage of the most recent period of time corresponding to a supply action. Similarly, as used herein, the exhaust drive percentage defines the proportion or percentage of the most recent period of time during which the input signals provided to the exhaust converter 106 drive the exhaust converter 106 to the open state to cause pressurized air to be removed (exhausted) from the actuator 124. That is, the exhaust drive percentage is the percentage of the most recent period of time corresponding to an exhaust action. For purposes of explanation, the most recent period of time used to calculate the supply and exhaust supply drive percentages is referred to herein as the drive percentage time window. The drive percentage drive window may correspond to any suitable duration (e.g., 1 second, 2 seconds, 3 seconds, 5 seconds, 10 seconds, 15 seconds, etc.).

In some examples, rather than defining the drive percentage drive window by a particular duration, the drive percentage drive window is defined by a set number of control actions corresponding to periodic times when a new input signal could be provided to either of the supply converter 104 or the exhaust converter 104. A control action may be a supply drive action (in which the supply converter 104 is directed to move (or remain) open), an exhaust drive action (in which the exhaust converter 106 is directed to move (or remain) open), or a neutral drive action (in which both converters 104, 106 are directed to move (or remain) closed). As mentioned above, in some examples, control actions are limited to once every 50 ms (or any other suitable time interval defined by the power constraints for the system). While a control action may occur every 50 ms, this does not necessarily mean that a new input signal is actually provided to one of the converters every 50 ms. Rather, as described above, an initial input signal may be provided to open one of the converters 104, 106 and then wait an appropriate amount of time (e.g., the duration of 5 control actions, 20 control actions, 100 control actions, etc.) before providing another input signal to close the corresponding converter.

As noted above, the drive percentage time window corresponds to a most recent period of time (or a corresponding number of control actions). Thus, as time advances, the input signals (and/or the corresponding control actions) driving the converters 104, 106 that contribute to the calculations of the supply and exhaust drive percentages change on a rolling basis. For example, assume the drive percentage time window is 20 seconds. Further assume that, at a first point in time, the most recent 20 seconds may be characterized by both converters 104, 106 being driven to the closed state (corresponding to neutral control actions) for the first 2 seconds, followed by the supply converter 104 being driven to the open state (corresponding to supply control actions) for the next 6 seconds, followed by both converters 104, 106 being closed (corresponding to neutral control actions) for 2 seconds, and the exhaust converter 106 being driven to the open state (corresponding to exhaust control actions) for the last 10 seconds (up until the first point in time). In this example, at the first point in time, the supply drive percentage is 30% (corresponding to the 6 of the 20 seconds during which the supply converter 104 was being driven to the open state) and the exhaust drive percentage is 50% (corresponding to the 10 of the 20 seconds during which the exhaust converter 106 was being driven to the open state).

Now, assume that 5 additional seconds pass during which no new input signals are provided to either converter 104, 106 such that the control sequence continues to drive the exhaust converter 106 to the open state with the supply converter 104 in the closed state. At this second point in time (5 seconds after the first point in time), the initial 2 seconds when both converters 104, 106 were closed and the subsequent 3 seconds during which the supply converter 104 was being driven to the open state are no longer within the drive percentage time window (e.g., the most recent 20 seconds). Therefore, the input signals associated with that 5 second range of time do not contribute to the calculation of the supply and exhaust drive percentages at the second point in time. Thus, at the second point in time, the supply drive percentage is now 15% (only 3 seconds out of the most recent 20 seconds are associated with driving the supply converter 104 to the open state) while the exhaust drive percentage is 75% (corresponding to last 15 seconds of the most recent 20 seconds in the drive percentage time window).

In some examples, the drive percentage analyzer 210 determines whether the supply drive percentage satisfies (e.g., exceeds) a supply drive threshold and/or whether the exhaust drive percentage satisfies (e.g., exceeds) an exhaust drive threshold. In some examples, either of the supply drive percentage or the exhaust drive percentage satisfying a corresponding threshold serves as a precondition to detecting a failure as described further below. More particularly, in some examples, a failure is inferred only when either the supply drive percentage or the exhaust drive percentage satisfies (e.g., exceeds) a relatively high threshold (e.g., 75%, 80%, 85%, 90%, 95%, 100%, etc.) over a given period of time. In some examples, the supply drive threshold and/or the exhaust drive threshold is set sufficiently high to exclude situations where both supply control actions and exhaust control actions have occurred within the drive percentage time window. That is, in some examples, the threshold is satisfied only when all or substantially all control actions within the drive percentage time window are either supply control actions or exhaust control actions (with the possibility of a relatively small number of neutral control actions in some examples). When the supply drive percentages or the exhaust drive percentages is relatively high over a given period (e.g., the drive percentage time window), a relatively substantial change in the pressure in the actuator 124 and/or movement of the valve 126 can be expected. As such, if one or more components of the example control device 102 is not working properly (e.g., the supply converter 104 is not opening in response to an open input signal), such that pressurized fluid is not being added or removed from the actuator 124 as expected, there will likely be a much smaller change in the pressure in the actuator 124 and/or movement of the valve 126 during the given period. As such, a failure may be inferred when a relatively small change in the pressure and/or position feedback data during such times. By contrast, when the supply drive percentage and the exhaust drive percentage are not particularly high over a given period, there is likely to be relatively little change in the pressure and/or corresponding movement of the actuator 124 and/or control valve 126 such that a comparison of the actual (e.g., measured) change in the feedback data cannot be relied on to indicate a failure.

In some examples, both the supply drive percentage and the exhaust drive percentage may be compared to the same common drive threshold. In other examples, a supply drive threshold may be defined for the supply drive percentage that is different than an exhaust drive threshold defined for the exhaust drive percentage. In some examples, the supply drive threshold and the exhaust drive threshold (and/or the common drive threshold) are stored in the example memory 218.

In the illustrated example of FIG. 2, the example failure detector 212 compares sensor feedback data at different points in time (associated with a given period when one of the supply or exhaust drive percentages satisfies a threshold) to determines whether a failure has occurred. More particularly, as mentioned above, in some examples a failure is detected based on changes in sensor feedback data measured at the different points in time satisfying a failure threshold. In some examples, the failure threshold is defined as some proportion of the difference between high and low limits on the operational ranges for the pressure and/or position for the associated actuator 124 and the control valve 126. That is, in some examples, the failure threshold for a change in pressure is defined as a percentage (e.g., 1%, 2%, 5%, 10%, etc.) of the difference between the high and low pressure limits defined for the operational range of the pneumatic actuator 124. Similarly, in some examples, the failure threshold for a change in position is defined as a percentage (e.g., 1%, 2%, 5%, 10%, etc.) of the difference between the 0% and 100% positions of the calibrated travel span (whether linear or rotational) of the control member in the control valve 126. In some examples, the particular value of the failure threshold is defined based on the minimum expected change in the pressure and/or position of the pneumatic actuator 124 and/or control valve 126 over the given time period between which the sensor feedback data is collected and compared. Thus, assuming the failure threshold is defined as 2% (because a change of at least 2% was expected over the relevant period of time), a failure will be inferred when the actual (measured) change in position over the given period is less than 2% of the full travel span of the control valve 126 and/or the change in pressure over the given period is less than 2% the difference between the minimum and maximum operational pressures for the pneumatic actuator 124. In some examples, different failure thresholds may be defined for each of the change in position and the change in pressure. In some examples, the same failure thresholds may be defined for both of the change in position and the change in pressure. In some examples, both the changes in pressure and the changes in position must satisfy the corresponding threshold(s) for a determination of a failure. In other examples, only one of pressure changes or the position changes needs to satisfy the corresponding threshold for a determination of a failure.

In some examples, the given period of time between which the sensor feedback data is compared corresponds to a threshold period of time defined based on the example counter 214 exceeding a particular counting threshold. Additionally or alternatively, the threshold period of time may be specified based on an elapsed period of time as determined by the example timer 216. The threshold period of time may correspond to any suitable duration (e.g., 1 second, 2 seconds, 3 seconds, 5 seconds, 10 seconds, 15 seconds, etc.). In some examples, the failure detector 212 determines when to initiate and/or reset the example counter 214 and/or the example timer 216. More particularly, in some examples, the failure detector 212 resets and/or initiates the example counter 214 and/or the example timer 216 in response to the beginning of a new supply action and/or a new exhaust action (e.g., in response to the input signal generator 208 providing an input signal to open either the supply converter 104 or the exhaust converter 106). However, as noted above, in some examples, the detection of failures is limited to circumstances where the supply drive percentage or the exhaust drive percentage satisfies a corresponding drive threshold as determined by the drive percentage analyzer 210. Accordingly, in some examples, the example counter 214 and/or the example timer 216 is initiated and/or reset only when a drive threshold is satisfied.

In some examples, at the time the counter 214 and/or the timer 216 are reset or initiated, the failure detector 212 causes the sensor feedback data received by the sensor interface 204 to be stored in the memory 218. The stored sensor feedback data serves as an initial reference point for comparison to the reference feedback data after the counter 214 and/or the timer 216 have satisfied a corresponding threshold. Thus, in some examples, once the counter 214 exceeds the corresponding threshold count and/or the timer 216 elapses the corresponding threshold time period, the example failure detector 212 determines a difference between the sensor feedback data at the current point in time relative to the initial sensor feedback data stored in the memory 218 at the time the counter 214 and/or timer 216 were initiated. In some examples, if the difference or change in the sensor feedback data satisfies (e.g., is less than) a failure threshold, the example failure detector 212 determines that a failure has occurred.

In some examples, once the failure detector 212 has detected a failure, the failure detector 212 may log the failure by incrementing a failure counter in the example memory 218. Further, in some examples the failure detector 212 may initiate a recovery procedure to attempt to resolve and/or recover from the detected failure. In some examples, the recovery procedure includes the input signal generator 208 generating a second input signal that is the same as the previous input signal that initiated the supply action or exhaust action associated with the detected failure. In some examples, this new input signal constitutes the beginning of a new supply action or exhaust action. Accordingly, in some such examples, the failure detector 212 initializes the counter 214 and/or the timer 216 and updates the stored sensor feedback data to again detect a failure after the counter 214 and/or timer 216 have reached the appropriate threshold corresponding to the relevant period of time.

Further, in some examples, the input signal generator 208 may provide, in response to a failure detected during an exhaust action, an input signal that directs the supply converter 104 to close to account for the possibility that the failure arises from the supply converter 104 and/or the associated supply relay 108 not being properly closed. Further, in some examples, the input signal generator 208 may provide, in response to a failure detected during a supply action, an input signal that directs the exhaust converter 106 to close to account for the possibility that the failure arises from the exhaust converter 106 and/or the associated exhaust relay 110 not being properly closed.

While an example manner of implementing the logic circuitry 116 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example sensor interface 204, the example sensor feedback analyzer 206, the example input signal generator 208, the example drive percentage analyzer 210, the example failure detector 212, the example counter 214, the example timer 216, the example memory 218, and/or, more generally, the example logic circuitry 116 of FIG. 1 may be implemented by hardware, software, firmware and/or any combination of hardware, software and/or firmware. Thus, for example, any of the example communications interface 202, the example sensor interface 204, the example sensor feedback analyzer 206, the example input signal generator 208, the example drive percentage analyzer 210, the example failure detector 212, the example counter 214, the example timer 216, the example memory 218 and/or, more generally, the example logic circuitry 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example sensor interface 204, the example sensor feedback analyzer 206, the example input signal generator 208, the example drive percentage analyzer 210, the example failure detector 212, the example counter 214, the example timer 216, and/or the example memory 218 is/are hereby expressly defined to include a non-transitory computer readable storage device or storage disk such as a memory, a digital versatile disk (DVD), a compact disk (CD), a Blu-ray disk, etc. including the software and/or firmware. Further still, the example logic circuitry 116 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
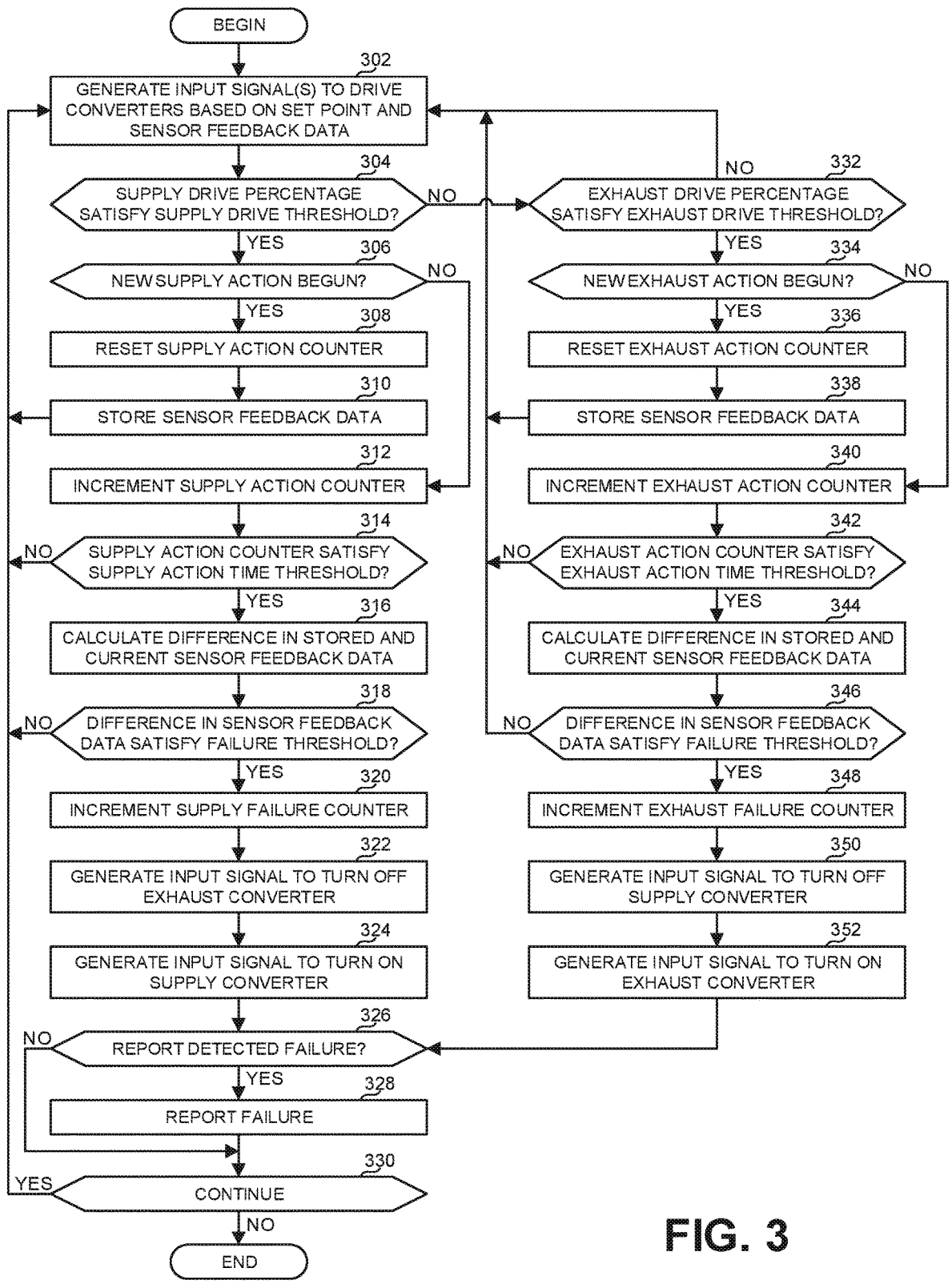
FIG. 3 is a flowchart representative of example machine readable instructions that may be executed to implement the example logic circuitry of FIGS. 1 and/or 2.

A flowchart representative of example hardware logic, machine readable instructions, hardware implemented state machines, and/or any combination thereof for implementing the logic circuitry 116 of FIGS. 1 and/or 2 is shown in FIG. 3. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example logic circuitry 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 3 begins at block 302 where the example input signal generator 208 generates input signal(s) to drive the supply converter 104 and the exhaust converter 106 based on a set point and sensor feedback data. At block 304, the example drive percentage analyzer 210 determines whether the supply drive percentage satisfies a supply drive threshold. In some examples, the supply drive threshold is relatively high (e.g., 75%, 80% 85%, 90%, 95%) and is satisfied when the supply drive percentage exceeds the threshold. If the example drive percentage analyzer 210 determines that the supply drive threshold has been satisfied, control advances to block 306 where the example failure detector 212 determines whether a new supply action has begun. A new supply action has begun if the example input signal generator 208 generates (e.g., at block 302) a new input signal that directs the supply converter 104 to turn on and move to the open state. If a new supply action has begun, control advances to block 308 where the example failure detector 212 resets and/or initiates a supply action counter (e.g., the example counter 214). Additionally or alternatively, in some examples, the failure detector 212 resets and/or initiates a timer (e.g., the example timer 216). At block 310, the example failure detector 212 stores sensor feedback data (e.g., a current position of the valve 126 as measured by the example position sensor 112 and/or a current pressure in the actuator 124 as measured by the pressure sensor 114). Thereafter, control returns to block 302 to continue to drive the converters 104, 106 based on the set point and the sensor feedback data.

Returning to block 306, if the example failure detector 212 determines that a new supply action has not begun (e.g., a supply action was previously initiated in the past and still ongoing), control advances to block 312 where the example failure detector 212 increments the supply action counter. In some examples, the logic circuitry 116 iterates through the process of FIG. 3 on a regular basis (e.g., every 50 ms) such that the incrementation of the supply action counter is indicative of a corresponding elapsed time period. Accordingly, at block 314, the example failure detector 212 determines whether the supply action counter satisfies (e.g., exceeds) a supply action time threshold. In other examples, where the example timer 216 is used instead of the counter 214, block 312 may be omitted and block 314 corresponds to the example failure detector 212 determining whether the elapsed time has satisfied (e.g., exceeds) the supply action time threshold. If the supply action time threshold has not been satisfied, control returns to block 302. Once the supply action time threshold has been satisfied, control advances to block 316.

At block 316, the example failure detector 212 calculates the difference in the stored sensor feedback data (e.g., stored at block 308) and the current sensor feedback data. That is, in some examples, the failure detector 212 calculates the absolute value of the difference between the position of the valve 126 at the time that the supply action time threshold was satisfied (determined at block 314) and the position of the valve 126 stored at block 310 when the supply action counter (or timer) was reset and/or initialized (at block 308). Additionally or alternatively, the example failure detector 212 calculates the absolute value of the difference between the pressure in the actuator 124 at the time that the supply action time threshold was satisfied (determined at block 314) and the pressure in the actuator 124 stored at block 310 when the supply action counter (or timer) was reset and/or initialized (at block 308). At block 318, the example failure detector 212 determines whether the difference in the sensor feedback data satisfies a failure threshold. In some examples, a different failure threshold is specified for the position sensor data than the pressure sensor data. In some examples, the failure detector 212 determines the failure threshold has been satisfied when both the position sensor data and the pressure sensor data satisfy a corresponding failure threshold. In other examples, the failure detector 212 determines the failure threshold has been satisfied when at least one of position sensor data or the pressure sensor data satisfies a corresponding failure threshold. In some examples, the failure threshold is relatively low (e.g., 1%, 2%, 3%, etc.) and is satisfied when the sensor feedback data is less than the threshold.

If the difference in sensor feedback data does not satisfy (e.g., is not below) the failure threshold, then no inference is made regarding a failure and control returns to block 302. However, if the example failure detector 212 determines that the sensor feedback data does satisfy the failure threshold at block 318, then a failure is inferred. Accordingly, in such situations, control advances to block 320 where the example failure detector 212 increments a supply failure counter to log the detected failure. Thereafter, control advances to block 322 where the example input signal generator 208 generates an input signal to turn off the exhaust converter 106. The input signal generated at block 322 serves to attempt a recovery from a possible intermittent failure in the exhaust converter 106 and/or the exhaust relay 110 that may have given rise to the detected failure based on a failure to close as expected in response to a previous input signal (e.g., previously provided at block 302). At block 324, the example input signal generator 208 generates an input signal to turn on the exhaust converter 104. The input signal generated at block 324 serves to attempt a recovery from a possible intermittent failure in the supply converter 104 and/or the exhaust relay 108 that may have given rise to the detected failure based on a failure to open as expected in response to a previous input signal (e.g., previously provided at block 302). In some examples, the input signal provided at block 324 constitutes the beginning of a new supply action that would cause the counter (or timer) to be reset and/or initialized at blocks 306 and 308, thereby initiating a new sequence to test for another failure (or confirm that the previously detected failure has been resolved and, therefore, was only intermittent).

At block 326, the example failure detector 212 determines whether to report the detected failure. If so, control advances to block 328 where the example communications interface reports the failure. In some examples, every detected failure is reported. In other examples, failures are reported after the supply failure counter is incremented a threshold number of times. In some examples, failures are reported when the supply failure counter is incremented a threshold number of times within a threshold period of time. After reporting the failure, control advances to block 330. Returning to block 326, if the detected failure is not to be reported, control advances directly to block 330. At block 330, the logic circuitry determines whether to continue the process. If so, control returns to block 302. Otherwise, the example process of FIG. 3 ends.

Returning to block 304, if the example drive percentage analyzer 210 determines that the supply drive percentage does not satisfy (e.g., does not exceed) the supply drive threshold, control advances to block 332 where the example drive percentage analyzer 210 determines whether the exhaust drive percentage satisfies an exhaust drive threshold. In some examples, the exhaust drive threshold is the same as the supply drive threshold. In other examples, the exhaust drive threshold and the supply drive threshold are different. If the exhaust drive threshold does not satisfy (e.g., does not exceed) the exhaust drive threshold, control returns to block 302. Otherwise, control advances to block 334.

In the illustrated example, blocks 334-348 generally correspond to blocks 306-320 except that blocks 334-348 are implemented in connection with an exhaust action, whereas blocks 306-320 correspond to a supply action. Thus, at block 334, the example failure detector 212 determines whether a new exhaust action has begun. If so, the example failure detector resets and/or initializes an exhaust action counter and/or timer (block 336) and stores the current sensor feedback data (block 338) before control returns to block 302. If the example failure detector 212 determines that a new exhaust action has not begun at block 334 (e.g., an exhaust action was previously initiated in the past and still ongoing), the example failure detector 212 increments the exhaust action counter (block 340) and/or allows a timer to elapse until an exhaust action time threshold has been satisfied (as determined at block 342). In some examples, the exhaust action time threshold is the same as the supply action time threshold. In other examples, the exhaust action time threshold is different than the supply action time threshold. At block 344, the example failure detector 212 calculates the difference in the stored sensor feedback data (e.g., stored at block 338) and the current sensor feedback data. If the difference does not satisfy (e.g., is not less than) a failure threshold, as determined at block 344, control returns to block 302. If the difference does satisfy (e.g., is less than) the failure threshold, control advances to block 348 where the example failure detector 212 increments an exhaust failure counter to log the detected failure. In some examples, the failure threshold for the difference in sensor feedback data is the same for both supply actions and exhaust actions. In other examples, the failure threshold for the difference in sensor feedback data is different as between the supply actions and exhaust actions. Further, although the example process indicates a separate supply failure counter and exhaust failure counter, in other examples, a single counter may be used to collectively track failures detected both during supply actions and during exhaust actions.

At block 350, the example input signal generator 208 generates an input signal to turn off the supply converter (e.g., to attempt to recover from a possible failure in the supply converter 104 and/or the supply relay 108). At block 352, the example input signal generator 208 generates an input signal to turn on the exhaust converter (e.g., to attempt to recover from a possible failure in the exhaust converter 106 and/or the exhaust relay 110). Thereafter, control advances to block 326 to proceed as outlined above.

Figure 4:
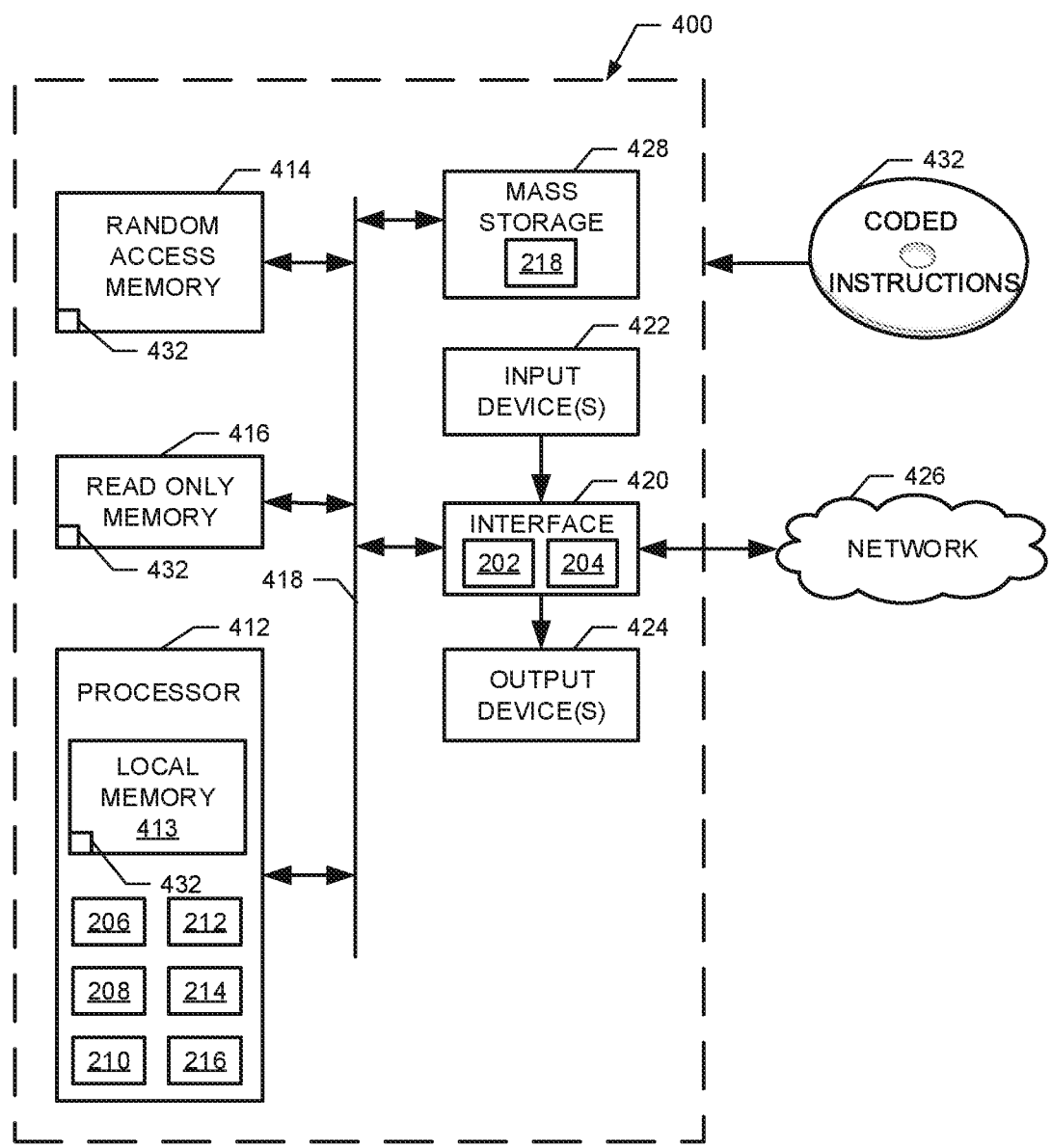
FIG. 4 is a block diagram of an example processing platform structured to execute the example instructions of FIG. 3 to implement the example logic circuitry of FIGS. 1 and/or 2.

FIG. 4 is a block diagram of an example processor platform 400 structured to execute the instructions of FIG. 3 to implement the logic circuitry 116 of FIGS. 1 and/or 2. The processor platform 400 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor feedback analyzer 206, the example input signal generator 208, the example drive percentage analyzer 210, the example failure detector 212, the example counter 214, and the example timer 216.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device (s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 3 may be stored in the mass storage device 428, in the volatile memory 414, in the non-volatile memory 416, and/or on a removable non-transitory computer readable storage medium such as a CD or DVD.

From the foregoing, it will be appreciated that example methods, apparatus and articles of manufacture have been disclosed that enable control devices with electro-pneumatic converters to operate with less power than other similar devices because the converters are turned on based on a digital input signal that triggers a first current to initially open the converter and then applies a second, reduced current to maintain the converter in the open state. While such an implementation saves power, it creates the possibility that the control device may intermittently fail by not responding to the initial high current and remain stuck in that state. Examples disclosed herein overcome this technological challenge by detecting such failures by monitoring sensor feedback over time and automatically reissuing input signals to the converters in response to detected failure(s). The reissued input signals are provided to attempt to automatically resolve the failure and restore the control device to normal operation without direct human involvement. Further, in some examples, the detected failures may be tracked or logged over time to give an indication of how often intermittent failures occur to facilitate maintenance personnel in anticipating the possibility of a complete failure in the device so as to replace or otherwise fix the device before the complete failure occurs.

Example methods, apparatus, systems, and articles of manufacture to detect and/or recover from failures in valve control devices are disclosed herein. Further examples and combinations thereof include the following:

Example 1 includes an apparatus comprising an input signal generator to provide a digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the digital input signal to trigger application of a current to the first converter to open the first converter, and a failure detector to determine a difference in at least one of a pressure in the actuator or a position of a flow control member in the valve over a period of time following the first point in time, and detect a failure of at least one of the supply converter, the exhaust converter, the supply relay, or the exhaust relay when the difference satisfies a failure threshold.

Example 2 includes the apparatus of example 1, further including a drive percentage analyzer to determine a supply drive percentage during a time window corresponding to a most recent time period, the supply drive percentage corresponding to a first proportion of time associated with one or more supply actions during the time window, and determine an exhaust drive percentage during the time window, the exhaust drive percentage corresponding to a second proportion of time associated with one or more exhaust actions during the time window, the failure detector to determine the difference when at least one of (1) the supply drive percentage remains above a supply drive threshold as the time window advances through the period of time or (2) the exhaust drive percentage remains above an exhaust drive threshold as the time window advances through the period of time.

Example 3 includes the apparatus of example 2, wherein the supply drive threshold and the exhaust drive threshold are greater than 75%.

Example 4 includes the apparatus of example 1, wherein the current is a first current, the digital input signal to trigger application of a second current following application of the first current, the second current to be lower than the first current.

Example 5 includes the apparatus of example 4, wherein the digital input signal is a first digital input signal, the input signal generator to automatically provide, in response to the failure detector detecting the failure, a second digital input signal to the first converter, the second digital input signal to trigger a subsequent application of the first current to the first converter to open the first converter.

Example 6 includes the apparatus of example 1, wherein the digital input signal is a first digital input signal and the current is a first current, the input signal generator to automatically provide, in response to the failure detector detecting the failure, a second digital input signal to a second converter corresponding to a different one of the supply converter or the exhaust converter than the first converter, the second digital input signal to trigger application of a second current to the second converter to close the second converter.

Example 7 includes the apparatus of example 1, wherein the failure detector is to log the failure in memory.

Example 8 includes the apparatus of example 1, further including a communications interface to report the failure to a controller in the process control system.

Example 9 includes the apparatus of example 1, wherein the failure threshold corresponds to a percentage of at least one of a pressure operating range of the actuator or a calibrated travel span of the valve.

Example 10 includes the apparatus of example 9, wherein the difference is to satisfy the failure threshold when the difference is less than the failure threshold, the failure threshold being less than 10% of the corresponding pressure operating range or the position operating range.

Example 11 includes a non-transitory computer readable medium comprising instructions that, when executed, cause a machine to at least provide a digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the digital input signal to trigger application of a current to the first converter to open the first converter, determine a difference in at least one of a pressure in the actuator or a position of a flow control member in the valve over a period of time following the first point in time, and detect a failure of at least one of the supply converter, the exhaust converter, the supply relay, or the exhaust relay when the difference satisfies a failure threshold.

Example 12 includes the non-transitory computer readable medium of example 11, wherein the instructions further cause the machine to determine a supply drive percentage during a time window corresponding to a most recent time period, the supply drive percentage corresponding to a first proportion of time associated with one or more supply actions during the time window, and determine an exhaust drive percentage during the time window, the exhaust drive percentage corresponding to a second proportion of time associated with one or more exhaust actions during the time window, the difference to be determined when at least one of (1) the supply drive percentage remains above a supply drive threshold as the time window advances through the period of time or (2) the exhaust drive percentage remains above an exhaust drive threshold as the time window advances through the period of time.

Example 13 includes the non-transitory computer readable medium of example 12, wherein the supply drive threshold and the exhaust drive threshold are greater than 75%.

Example 14 includes the non-transitory computer readable medium of example 11, wherein the current is a first current, the digital input signal to trigger application of a second current following application of the first current, the second current to be lower than the first current.

Example 15 includes the non-transitory computer readable medium of example 14, wherein the digital input signal is a first digital input signal, the instructions to further cause the machine to automatically provide, in response to detecting the failure, a second digital input signal to the first converter, the second digital input signal to trigger a subsequent application of the first current to the first converter to open the first converter.

Example 16 includes the non-transitory computer readable medium of example 11, wherein the digital input signal is a first digital input signal and the current is a first current, the instructions to further cause the machine to automatically provide, in response to detecting the failure, a second digital input signal to a second converter corresponding to a different one of the supply converter or the exhaust converter than the first converter, the second digital input signal to trigger application of a second current to the second converter to close the second converter.

Example 17 includes the non-transitory computer readable medium of example 11, wherein the instructions further cause the machine to log the failure in memory.

Example 18 includes the non-transitory computer readable medium of example 11, wherein the instructions further cause the machine to report the failure to a controller in the process control system.

Example 19 includes the non-transitory computer readable medium of example 11, wherein the failure threshold corresponds to a percentage of at least one of a pressure operating range of the actuator or a calibrated travel span of the valve.

Example 20 includes the non-transitory computer readable medium of example 19, wherein the difference is to satisfy the failure threshold when the difference is less than the failure threshold, the failure threshold being less than 10% of the corresponding pressure operating range or the position operating range.

Example 21 includes a method comprising providing a digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the digital input signal to trigger application of a current to the first converter to open the first converter, determining a difference in at least one of a pressure in the actuator or a position of a flow control member in the valve over a period of time following the first point in time, and detecting a failure of at least one of the supply converter, the exhaust converter, the supply relay, or the exhaust relay when the difference satisfies a failure threshold.

Example 22 includes the method of example 21, further including determining a supply drive percentage during a time window corresponding to a most recent time period, the supply drive percentage corresponding to a first proportion of time associated with one or more supply actions during the time window, and determining an exhaust drive percentage during the time window, the exhaust drive percentage corresponding to a second proportion of time associated with one or more exhaust actions during the time window, the difference to be determined when at least one of (1) the supply drive percentage remains above a supply drive threshold as the time window advances through the period of time or (2) the exhaust drive percentage remains above an exhaust drive threshold as the time window advances through the period of time.

Example 23 includes the method of example 22, wherein the supply drive threshold and the exhaust drive threshold are greater than 75%.

Example 24 includes the method of example 21, wherein the current is a first current, the digital input signal to trigger application of a second current following application of the first current, the second current to be lower than the first current.

Example 25 includes the method of example 24, wherein the digital input signal is a first digital input signal, the method further including, in response to detecting the failure, automatically providing a second digital input signal to the first converter, the second digital input signal to trigger a subsequent application of the first current to the first converter to open the first converter.

Example 26 includes the method of example 21, wherein the digital input signal is a first digital input signal and the current is a first current, the method further including, in response to detecting the failure, automatically providing a second digital input signal to a second converter corresponding to a different one of the supply converter or the exhaust converter than the first converter, the second digital input signal to trigger application of a second current to the second converter to close the second converter.

Example 27 includes the method of example 21, further including logging the failure in memory.

Example 28 includes the method of example 21, further including reporting the failure to a controller in the process control system.

Example 29 includes the method of example 21, wherein the failure threshold corresponds to a percentage of at least one of a pressure operating range of the actuator or a calibrated travel span of the valve.

Example 30 includes the method of example 29, wherein the difference is to satisfy the failure threshold when the difference is less than the failure threshold, the failure threshold being less than 10% of the corresponding pressure operating range or the position operating range.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   interface circuitry;
   computer readable instructions; and
   programmable circuitry to at least one of instantiate or execute the computer readable instructions to:
   provide a digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the digital input signal to trigger application of a current to the first converter to open the first converter;
   determine a supply drive percentage during a time window corresponding to a most recent time period, the supply drive percentage corresponding to a first proportion of time associated with one or more supply actions during the time window;
   determine an exhaust drive percentage during the time window, the exhaust drive percentage corresponding to a second proportion of time associated with one or more exhaust actions during the time window;
   determine a difference in at least one of a pressure in the actuator or a position of a flow control member in the valve over a period of time following the first point in time when at least one of (1) the supply drive percentage remains above a supply drive threshold as the time window advances through the period of time or (2) the exhaust drive percentage remains above an exhaust drive threshold as the time window advances through the period of time; and
   detect a failure of at least one of the supply converter, the exhaust converter, the supply relay, or the exhaust relay when the difference satisfies a failure threshold.

2. The apparatus of claim 1, wherein the supply drive threshold and the exhaust drive threshold are greater than 75%.

3. The apparatus of claim 1, wherein the current is a first current, the digital input signal to trigger application of a second current following application of the first current, the second current to be lower than the first current.

4. The apparatus of claim 3, wherein the digital input signal is a first digital input signal, the programmable circuitry to automatically provide, in response to detection of the failure, a second digital input signal to the first converter, the second digital input signal to trigger a subsequent application of the first current to the first converter to open the first converter.

5. The apparatus of claim 1, wherein the digital input signal is a first digital input signal and the current is a first current, the programmable circuitry to automatically provide, in response to detection of the failure, a second digital input signal to a second converter corresponding to a different one of the supply converter or the exhaust converter than the first converter, the second digital input signal to trigger application of a second current to the second converter to close the second converter.

6. The apparatus of claim 1, wherein the programmable circuitry is to log the failure in memory.

7. The apparatus of claim 1, wherein the interface circuitry is to report the failure to a controller in the process control system.

8. The apparatus of claim 1, wherein the failure threshold corresponds to a percentage of at least one of a pressure operating range of the actuator or a calibrated travel span of the valve.

9. The apparatus of claim 8, wherein the difference is to satisfy the failure threshold when the difference is less than the failure threshold, the failure threshold being less than 10% of the corresponding pressure operating range or the calibrated travel span.

10. A non-transitory computer readable medium comprising instructions that, when executed, cause a machine to at least:
   provide a digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the digital input signal to trigger application of a current to the first converter to open the first converter;

determine a supply drive percentage during a time window corresponding to a most recent time period, the supply drive percentage corresponding to a first proportion of time associated with one or more supply actions during the time window;
determine an exhaust drive percentage during the time window, the exhaust drive percentage corresponding to a second proportion of time associated with one or more exhaust actions during the time window;
determine a difference in at least one of a pressure in the actuator or a position of a flow control member in the valve over a period of time following the first point in time when at least one of (1) the supply drive percentage remains above a supply drive threshold as the time window advances through the period of time or (2) the exhaust drive percentage remains above an exhaust drive threshold as the time window advances through the period of time; and
detect a failure of at least one of the supply converter, the exhaust converter, the supply relay, or the exhaust relay when the difference satisfies a failure threshold.

11. The non-transitory computer readable medium of claim 10, wherein the current is a first current, the digital input signal to trigger application of a second current following application of the first current, the second current to be lower than the first current.

12. A non-transitory computer readable medium comprising instructions that, when executed, cause a machine to at least:
provide a first digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the first digital input signal to trigger application of a first current to the first converter to open the first converter and to trigger application of a second current following application of the first current, the second current to be lower than the first current;
determine a difference in at least one of a pressure in the actuator or a position of a flow control member in the valve over a period of time following the first point in time;
detect a failure of at least one of the supply converter, the exhaust converter, the supply relay, or the exhaust relay when the difference satisfies a failure threshold; and
automatically provide, in response to detecting the failure, a second digital input signal to the first converter, the second digital input signal to trigger a subsequent application of the first current to the first converter to open the first converter.

13. A non-transitory computer readable medium comprising instructions that, when executed, cause a machine to at least:
provide a first digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the first digital input signal to trigger application of a first current to the first converter to open the first converter;
determine a difference in at least one of a pressure in the actuator or a position of a flow control member in the valve over a period of time following the first point in time;
detect a failure of at least one of the supply converter, the exhaust converter, the supply relay, or the exhaust relay when the difference satisfies a failure threshold; and
automatically provide, in response to detecting the failure, a second digital input signal to a second converter corresponding to a different one of the supply converter or the exhaust converter than the first converter, the second digital input signal to trigger application of a second current to the second converter to close the second converter.

14. The non-transitory computer readable medium of claim 10, wherein the supply drive threshold and the exhaust drive threshold are greater than 75%.

15. The non-transitory computer readable medium of claim 10, wherein the instructions further cause the machine to report the failure to a controller in the process control system.

16. The non-transitory computer readable medium of claim 10, wherein the failure threshold corresponds to a percentage of at least one of a pressure operating range of the actuator or a calibrated travel span of the valve.

17. A method comprising:
providing a digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the digital input signal to trigger application of a current to the first converter to open the first converter;
determining a supply drive percentage during a time window corresponding to a most recent time period, the supply drive percentage corresponding to a first proportion of time associated with one or more supply actions during the time window;
determining an exhaust drive percentage during the time window, the exhaust drive percentage corresponding to a second proportion of time associated with one or more exhaust actions during the time window;
determining a difference in at least one of a pressure in the actuator or a position of a flow control member in the valve over a period of time following the first point in time when at least one of (1) the supply drive percentage remains above a supply drive threshold as the time window advances through the period of time or (2) the exhaust drive percentage remains above an exhaust drive threshold as the time window advances through the period of time; and
detecting a failure of at least one of the supply converter, the exhaust converter, the supply relay, or the exhaust relay when the difference satisfies a failure threshold.

18. The method of claim 17, wherein the current is a first current, the digital input signal to trigger application of a second current following application of the first current, the second current to be lower than the first current.

19. A method comprising:
providing a first digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the first digital input signal to trigger application of a first current to the first converter to open the first converter and to trigger application of a second current following application of the first current, the second current to be lower than the first current;

determining a difference in at least one of a pressure in the actuator or a position of a flow control member in the valve over a period of time following the first point in time;

detecting a failure of at least one of the supply converter, the exhaust converter, the supply relay, or the exhaust relay when the difference satisfies a failure threshold; and in response to detecting the failure, automatically providing a second digital input signal to the first converter, the second digital input signal to trigger a subsequent application of the first current to the first converter to open the first converter.

20. A method comprising:

providing a first digital input signal to a first converter at a first point in time, the first converter corresponding to one of a supply converter or an exhaust converter, the supply converter to control actuation of a supply relay to deliver pressurized fluid to an actuator operatively coupled to a valve in a process control system, the exhaust converter to control actuation of an exhaust relay to exhaust the pressurized fluid from the actuator, the first digital input signal to trigger application of a first current to the first converter to open the first converter;

determining a difference in at least one of a pressure in the actuator or a position of a flow control member in the valve over a period of time following the first point in time;

detecting a failure of at least one of the supply converter, the exhaust converter, the supply relay, or the exhaust relay when the difference satisfies a failure threshold; and in response to detecting the failure, automatically providing a second digital input signal to a second converter corresponding to a different one of the supply converter or the exhaust converter than the first converter, the second digital input signal to trigger application of a second current to the second converter to close the second converter.

* * * * *